(12) United States Patent
Iwatsuki

(10) Patent No.: US 11,097,701 B2
(45) Date of Patent: Aug. 24, 2021

(54) CONTROLLER OF MOTORCYCLE BRAKE SYSTEM, MOTORCYCLE BRAKE SYSTEM, AND CONTROL METHOD OF MOTORCYCLE BRAKE SYSTEM

(71) Applicant: Robert Bosch GmbH, Stuttgart (DE)

(72) Inventor: Junya Iwatsuki, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 16/336,929

(22) PCT Filed: Aug. 9, 2017

(86) PCT No.: PCT/IB2017/054859
§ 371 (c)(1),
(2) Date: Mar. 27, 2019

(87) PCT Pub. No.: WO2018/065838
PCT Pub. Date: Apr. 12, 2018

(65) Prior Publication Data
US 2020/0031325 A1 Jan. 30, 2020

(30) Foreign Application Priority Data
Oct. 5, 2016 (JP) .............................. JP2016-196931

(51) Int. Cl.
*B60T 8/17* (2006.01)
*B60T 8/24* (2006.01)
(Continued)

(52) U.S. Cl.
CPC ............ *B60T 8/1706* (2013.01); *B60T 8/241* (2013.01); *B60T 8/3225* (2013.01); *B62L 1/00* (2013.01);
(Continued)

(58) Field of Classification Search
CPC ...... B60T 8/1706; B60T 8/241; B60T 8/3225; B60T 2201/16; B60T 2220/04;
(Continued)

(56) References Cited

U.S. PATENT DOCUMENTS 4,989,922 A 2/1991 Pickenhahn et al.
2012/0200148 A1* 8/2012 Waida .................. B60T 13/662
303/191

FOREIGN PATENT DOCUMENTS

CN 1972831 A 5/2007
CN 102574516 A 7/2012
(Continued)

OTHER PUBLICATIONS

International Search Report for Application No. PCT/IB2017/054859 dated Feb. 27, 2018 (English Translation, 3 pages).

*Primary Examiner* — Yuen Wong
(74) *Attorney, Agent, or Firm* — Michael Best & Friedrich LLP

(57) ABSTRACT

A controller and a control method of a motorcycle brake system including a brake operator, a wheel braking assembly, and a controller. The controller is configured to perform a lean angle obtainment step during turning, and perform a positive gradient setting step. The positive gradient corresponds to the lean angle obtained. The controller is also configured to initiate a braking force suppression operation in states where the motorcycle makes a turn and increases input to the brake operator. This operation is executed to increase braking force generated by the wheel braking assembly in a smaller positive gradient of hydraulic pressure in a wheel cylinder than a positive gradient of hydraulic pressure in a master cylinder when the braking force on the wheel depends only on the input to the brake operator. The
(Continued)

braking force suppression operation is initiated in the positive gradient when an initiation reference is satisfied.

10 Claims, 7 Drawing Sheets

(51) Int. Cl.
  *B60T 8/32* (2006.01)
  *B62L 1/00* (2006.01)
  *B62L 3/02* (2006.01)
(52) U.S. Cl.
  CPC ........... *B62L 3/023* (2013.01); *B60T 2201/16* (2013.01); *B60T 2220/04* (2013.01); *B60T 2230/02* (2013.01); *B60T 2250/04* (2013.01); *B60T 2270/10* (2013.01); *B60T 2270/30* (2013.01)

(58) Field of Classification Search
  CPC ............. B60T 2230/02; B60T 2250/04; B60T 2270/10; B60T 2270/30; B62L 1/00; B62L 3/023
  See application file for complete search history.

(56) References Cited

FOREIGN PATENT DOCUMENTS

| | | |
|---|---|---|
| CN | 103118911 A | 5/2013 |
| EP | 2138365 | 12/2009 |
| EP | 2657094 | 10/2013 |
| EP | 2886431 | 6/2015 |
| JP | H1059149 A | 3/1998 |
| JP | 2010012903 | 1/2010 |
| TW | 201813847 A | 4/2018 |
| WO | 2012086289 | 6/2012 |

* cited by examiner

CONTROLLER OF MOTORCYCLE BRAKE SYSTEM, MOTORCYCLE BRAKE SYSTEM, AND CONTROL METHOD OF MOTORCYCLE BRAKE SYSTEM

BACKGROUND OF THE INVENTION

The invention relates to a controller and a control method of a motorcycle brake system capable of meeting requests of downsizing, cost cut, simplification, and the like, and to a motorcycle brake system including such a controller.

As a conventional motorcycle brake system, a motorcycle brake system that includes: a brake operation section provided in a motorcycle; and a wheel braking mechanism that brakes wheels of the motorcycle has been available. In a normal state, the wheel braking mechanism brakes the wheels using a braking force that depends only on input to the brake operation section. That is, for example, in the case where the motorcycle brake system includes: a master cylinder that generates a hydraulic pressure of a brake fluid corresponding to the input to the brake operation section; a wheel cylinder that brakes the wheel using the hydraulic pressure generated in the brake fluid; and a hydraulic pressure control unit that is interposed therebetween, in the normal state, the hydraulic pressure of the brake fluid in the wheel cylinder is equal to the hydraulic pressure of the brake fluid in the master cylinder.

Furthermore, when the input to the brake operation section is increased in a state where the motorcycle makes a turn, a controller initiates a braking force suppression operation. Once the braking force suppression operation is initiated, the controller increases the braking force, which is generated by the wheel braking mechanism, in a gentler positive gradient than the positive gradient in the normal state. That is, for example, when the hydraulic pressure of the brake fluid in the master cylinder is increased in the state where the motorcycle makes the turn, the controller controls an operation of the hydraulic pressure control unit to increase the hydraulic pressure of the brake fluid in the wheel cylinder in the gentler positive gradient than the positive gradient of the hydraulic pressure of the brake fluid in the master cylinder. With such control, behavior of the motorcycle, which makes the turn, is suppressed from becoming abruptly unstable by the input to the brake operation section. The motorcycle brake system includes a sensor (a hydraulic pressure sensor or the like) that can detect the input to the brake operation section, and the positive gradient in the braking force suppression operation is set on the basis of a signal of the sensor (for example, see WO 2012/086289).

SUMMARY OF INVENTION

The sensor that can detect the input to the brake operation section is essential for the conventional motorcycle brake system. In particular, because requests of downsizing, cost cut, simplification, and the like for the motorcycle brake system are strong when compared to other vehicles, a request of elimination of the sensor is strong. That is, there has been such a problem that, in order to realize the braking force suppression operation, the sensor that can detect the input to the brake operation section cannot be eliminated from the conventional motorcycle brake system and thus it is difficult to meet the requests of downsizing, cost cut, simplification, and the like.

The invention has been made with the above-described problem as the background and therefore obtains a controller and a control method of a motorcycle brake system capable of meeting requests of downsizing, cost cut, simplification, and the like. In addition, the invention obtains a motorcycle brake system including such a controller.

In regard to a controller of a motorcycle brake system according to the invention, the motorcycle brake system includes: brake operation sections that are provided in a motorcycle; and wheel braking mechanisms that brake wheels of the motorcycle. The controller includes: a brake operation execution section that initiates a braking force suppression operation in states where the motorcycle makes a turn and input to each of the brake operation sections is increased, the braking force suppression operation being executed to increase braking forces, which are generated by the wheel braking mechanisms, in a gentler positive gradient than the positive gradient in a case where the braking forces on the wheels, which are generated by the wheel braking mechanisms, depend only on the input to the brake operation sections; and a positive gradient setting section that sets the positive gradient in the braking force suppression operation. When an initiation reference is satisfied, the brake operation execution section initiates the braking force suppression operation in the positive gradient set by the positive gradient setting section. The controller further includes a lean angle obtainment section that obtains a lean angle during turning of the motorcycle. The positive gradient setting section sets the positive gradient that corresponds to the lean angle obtained by the lean angle obtainment section as the positive gradient in the braking force suppression operation.

A motorcycle brake system according to the invention includes the above-described controller.

In regard to a control method of a motorcycle brake system according to the invention, the motorcycle brake system includes: brake operation sections that are provided in a motorcycle; and wheel braking mechanisms that brake wheels of the motorcycle. The control method includes: a brake operation execution step to initiate a braking force suppression operation in states where the motorcycle makes a turn and input to each of the brake operation sections is increased, the braking force suppression operation being executed to increase braking forces, which are generated by the wheel braking mechanisms, in a gentler positive gradient than the positive gradient in a case where the braking forces on the wheels, which are generated by the wheel braking mechanisms, depend only on the input to the brake operation sections; and a positive gradient setting step to set the positive gradient in the braking force suppression operation. In the brake operation execution step, when an initiation reference is satisfied, the braking force suppression operation is initiated in the positive gradient, which is set in the positive gradient setting step. The control method further includes a lean angle obtainment step to obtain a lean angle during turning of the motorcycle. In the positive gradient setting step, the positive gradient that corresponds to the lean angle obtained in the lean angle obtainment step is set as the positive gradient in the braking force suppression operation.

In the controller and the control method of the motorcycle brake system and the motorcycle brake system according to the invention, the positive gradient that corresponds to the lean angle obtained during turning of the motorcycle is set. When the initiation reference is satisfied, the braking force suppression operation to increase the braking forces, which are generated by the wheel braking mechanisms, in the positive gradient is initiated. Thus, a sensor that can detect the input to the brake operation sections can be eliminated, and requests of simplification, downsizing, cost cut, and the like of the motorcycle brake system can be met.

DETAILED DESCRIPTION

Figure 1:
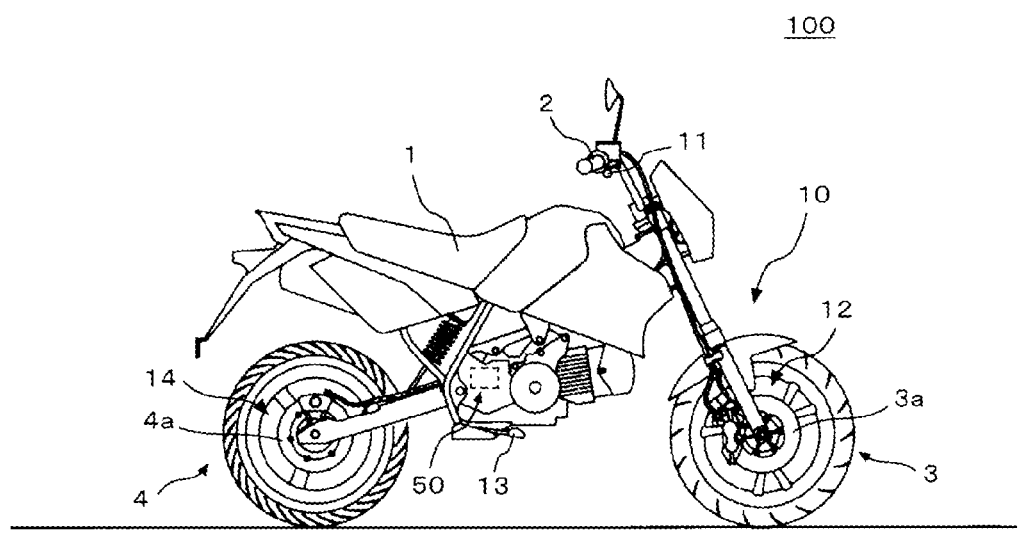
FIG. 1 is a view of one example of a configuration of a motorcycle, on which a motorcycle brake system according to an embodiment of the invention is mounted.

A description will hereinafter be made on a controller and a control method of a motorcycle brake system and the motorcycle brake system according to the invention by using the drawings.

Note that a description will hereinafter be made on a case where a motorcycle is a two-wheeled motor vehicle; however, the invention may also be applied to another type of the motorcycle. In addition, a description will hereinafter be made on a case where both of a wheel braking mechanism that brakes a front wheel and a wheel braking mechanism that brakes a rear wheel are targets of a braking force suppression operation; however, only one of those may be the target of the braking force suppression operation. Furthermore, a case where the single wheel braking mechanism that brakes the front wheel and the single wheel braking mechanism that brakes the rear wheel are provided will be described; however, only one of those may be provided, or at least one of those may be provided in plural.

Each of a configuration, an operation, and the like, which will be described below, is merely one example. The controller and the control method of the motorcycle brake system and the motorcycle brake system according to the invention are not limited to a case with such a configuration, an operation, and the like.

In the drawings, the same or similar members or portions will be denoted by the same reference sign. In addition, a detailed structure will appropriately be depicted in a simplified manner or will not be depicted.

A description will hereinafter be made on a motorcycle brake system according to an embodiment.

<Configuration of Motorcycle Brake System>

A description will be made on a configuration of the motorcycle brake system according to the embodiment.

Figure 2:
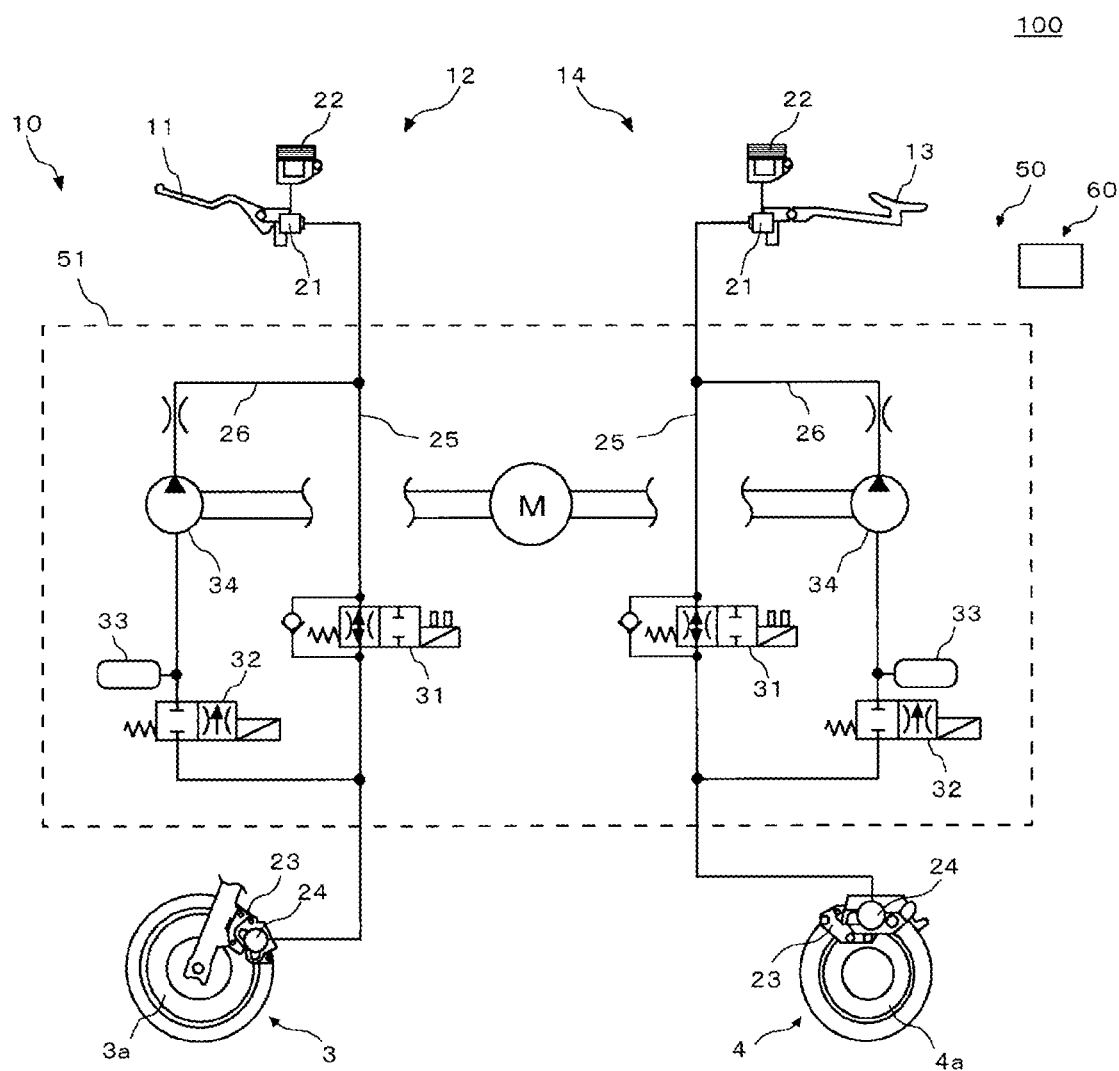
FIG. 2 is a view of one example of a configuration of the motorcycle brake system according to the embodiment of the invention.
Figure 3:
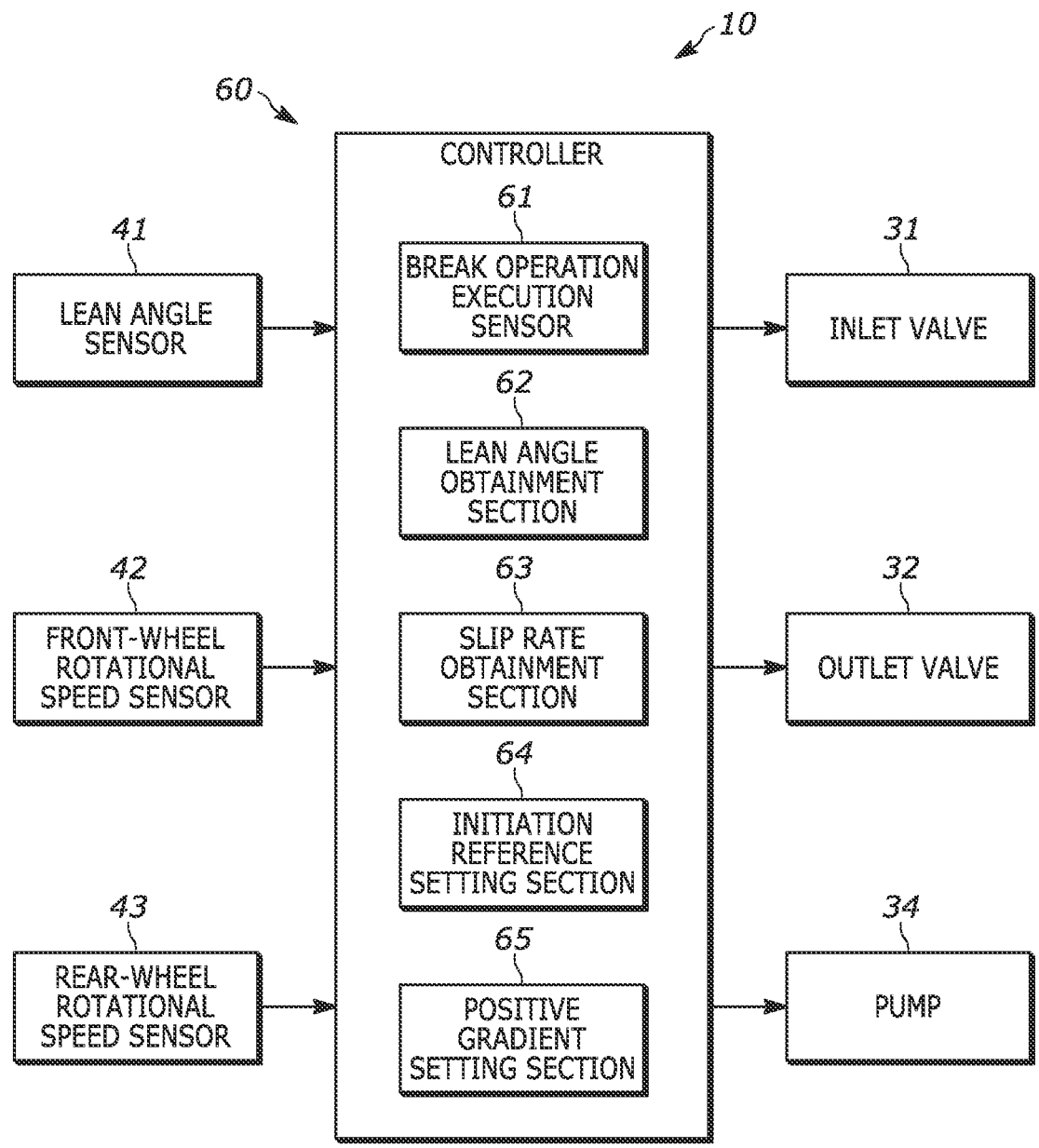
FIG. 3 is a view of one example of a system configuration of a main section in the motorcycle brake system according to the embodiment of the invention.

FIG. 1 is a view of one example of a configuration of a motorcycle, on which the motorcycle brake system according to the embodiment of the invention is mounted. FIG. 2 is a view of one example of the configuration of the motorcycle brake system according to the embodiment of the invention. FIG. 3 is a view of one example of a system configuration of a main section in the motorcycle brake system according to the embodiment of the invention.

As depicted in FIG. 1 and FIG. 2, a motorcycle brake system 10 is mounted on a motorcycle 100. The motorcycle 100 includes: a trunk 1; a handlebar 2 that is held by the trunk 1 in the freely turnable manner; a front wheel 3 that is held with the handlebar 2 by the trunk 1 in a freely turnable manner; and a rear wheel 4 that is held by the trunk 1 in the freely rotatable manner.

The motorcycle brake system 10 includes: a brake operation section 11; a wheel braking mechanism 12 that at least interlocks with the brake operation section 11 to brake the front wheel 3; a brake operation section 13; and a wheel braking mechanism 14 that at least interlocks with the brake operation section 13 to brake the rear wheel 4.

The brake operation section 11 is provided on the handlebar 2 and is operated by a user's hand. The brake operation section 11 is a brake lever, for example. The brake operation section 13 is provided in a lower section of the trunk 1 and is operated by a user's foot. The brake operation section 13 is a brake pedal, for example.

Each of the wheel braking mechanisms 12, 14 includes: a master cylinder 21 that includes a piston (not depicted) therein; a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which a brake fluid in the master cylinder 21 is delivered to the wheel cylinder 24; and a secondary channel 26 through which the brake fluid in the wheel cylinder 24 is released.

An inlet valve (EV) 31 is provided in the primary channel 25. The secondary channel 26 bypasses the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. The inlet valve 31 is an electromagnetic valve that is opened in an unenergized state and is closed in an energized state, for example. The outlet valve 32 is an electromagnetic valve that is closed in the unenergized state and is opened in the energized state, for example. Note that each of the wheel braking mechanisms 12, 14 may be configured to be able to supply the brake fluid in the master cylinder 21 to a suction side of the pump 34. That is, each of the wheel braking mechanisms 12, 14 may be able to increase a hydraulic pressure of the brake fluid in the wheel cylinder 24 by driving the pump 34.

A hydraulic pressure control unit 50 is configured by including: members such as the inlet valve 31, the outlet valve 32, the accumulator 33, and the pump 34; a base body 51 that is provided with those members and is formed with channels that constitute the primary channel 25 and the secondary channel 26; and a controller (an ECU) 60. In the motorcycle brake system 10, the hydraulic pressure control unit 50 is a unit that has a function of controlling the hydraulic pressure of the brake fluid in the wheel cylinder 24, that is, a braking force generated by each of the wheel braking mechanisms 12, 14.

The members may collectively be provided in the single base body 51 or may separately be provided in the plural base bodies 51. The controller 60 may be provided as one unit or may be divided into plural units. In addition, the controller 60 may be attached to the base body 51 or may be attached to a member other than the base body 51. Furthermore, the controller 60 may partially or entirely be constructed of a microcomputer, a microprocessor unit, or the like, may be constructed of a member in which firmware and the like can be updated, or may be a program module or the like that is executed by a command from a CPU or the like, for example.

In a normal state, the controller 60 opens the inlet valve 31 and closes the outlet valve 32. That is, in the normal state, the wheel braking mechanisms 12, 14 brakes the wheels (the front wheel 3 and the rear wheel 4) by the braking forces that respectively depend only on input to the brake operation sections 11, 13. When the brake operation section 11 is operated in such a state, in the wheel braking mechanism 12, the piston (not depicted) of the master cylinder 21 is pressed to increase the hydraulic pressure of the brake fluid in the wheel cylinder 24, the brake pad (not depicted) of the brake caliper 23 is pressed against a rotor 3a of the front wheel 3, and the front wheel 3 is thereby braked. When the brake operation section 13 is operated, in the wheel braking mechanism 14, the piston (not depicted) of the master cylinder 21 is pressed to increase the hydraulic pressure of the brake fluid in the wheel cylinder 24, the brake pad (not depicted) of the brake caliper 23 is pressed against a rotor 4a of the rear wheel 4, and the rear wheel 4 is thereby braked.

As depicted in FIG. 2 and FIG. 3, each of the wheel braking mechanisms 12, 14 as targets of a braking force suppression operation, which will be described below, is not provided with: a sensor that detects the hydraulic pressure of the brake fluid in the master cylinder 21; and a sensor that detects the hydraulic pressure of the brake fluid in the wheel cylinder 24. The motorcycle brake system 10 includes a lean angle sensor 41, a front-wheel rotational speed sensor 42, and a rear-wheel rotational speed sensor 43.

The lean angle sensor 41 detects a lean angle A during turning of the motorcycle 100. The lean angle sensor 41 may detect another physical quantity that can substantially be converted to the lean angle A. In addition, the lean angle sensor 41 may not be specialized in detection of the lean angle A, and a detection signal of the lean angle sensor 41 may be substituted by a detection signal of a sensor that detects another physical quantity. The front-wheel rotational speed sensor 42 detects a front-wheel rotational speed Vwf. The front-wheel rotational speed sensor 42 may detect another physical quantity that can substantially be converted to the front-wheel rotational speed Vwf. The rear-wheel rotational speed sensor 43 detects a rear-wheel rotational speed Vwr. The rear-wheel rotational speed sensor 43 may detect another physical quantity that can substantially be converted to the rear-wheel rotational speed Vwr.

The controller 60 includes a brake operation execution section 61, a lean angle obtainment section 62, a slip rate obtainment section 63, an initiation reference setting section 64, and a positive gradient setting section 65. The brake operation execution section 61 outputs a command that governs operations of the inlet valve 31, the outlet valve 32, the pump 34, and the like to execute the braking force suppression operation, which will be described below. In the braking force suppression operation, in at least at the time of initiation, the braking forces, which are generated by the wheel braking mechanisms 12, 14, are increased in the gentler positive gradient than the positive gradient in the normal state, that is, in the gentler positive gradient than the positive gradient of a case where the braking forces on the wheels (the front wheel 3 and the rear wheel 4), which are generated by the wheel braking mechanisms 12, 14, respectively depend only on the input to the brake operation sections 11, 13. In addition, the braking force suppression operation for the front wheel 3 is initiated in states where the motorcycle 100 makes a turn and the input to the brake operation section 11 is increased. The braking force suppression operation for the rear wheel 4 is initiated in states where the motorcycle 100 makes the turn and the input to the brake operation section 13 is increased. Preferably, the wheel braking mechanisms 12, 14 brake the wheels (the front wheel 3 and the rear wheel 4) in the normal state immediately before the braking force suppression operation is initiated.

<Operation of Motorcycle Brake System>

A description will be made on an operation of the motorcycle brake system according to the embodiment.

Note that a description will hereinafter be made on a case where the braking force suppression operation for the rear wheel 4 is executed; however, the same applies to a case where the braking force suppression operation for the front wheel 3 is executed.

Figure 4:
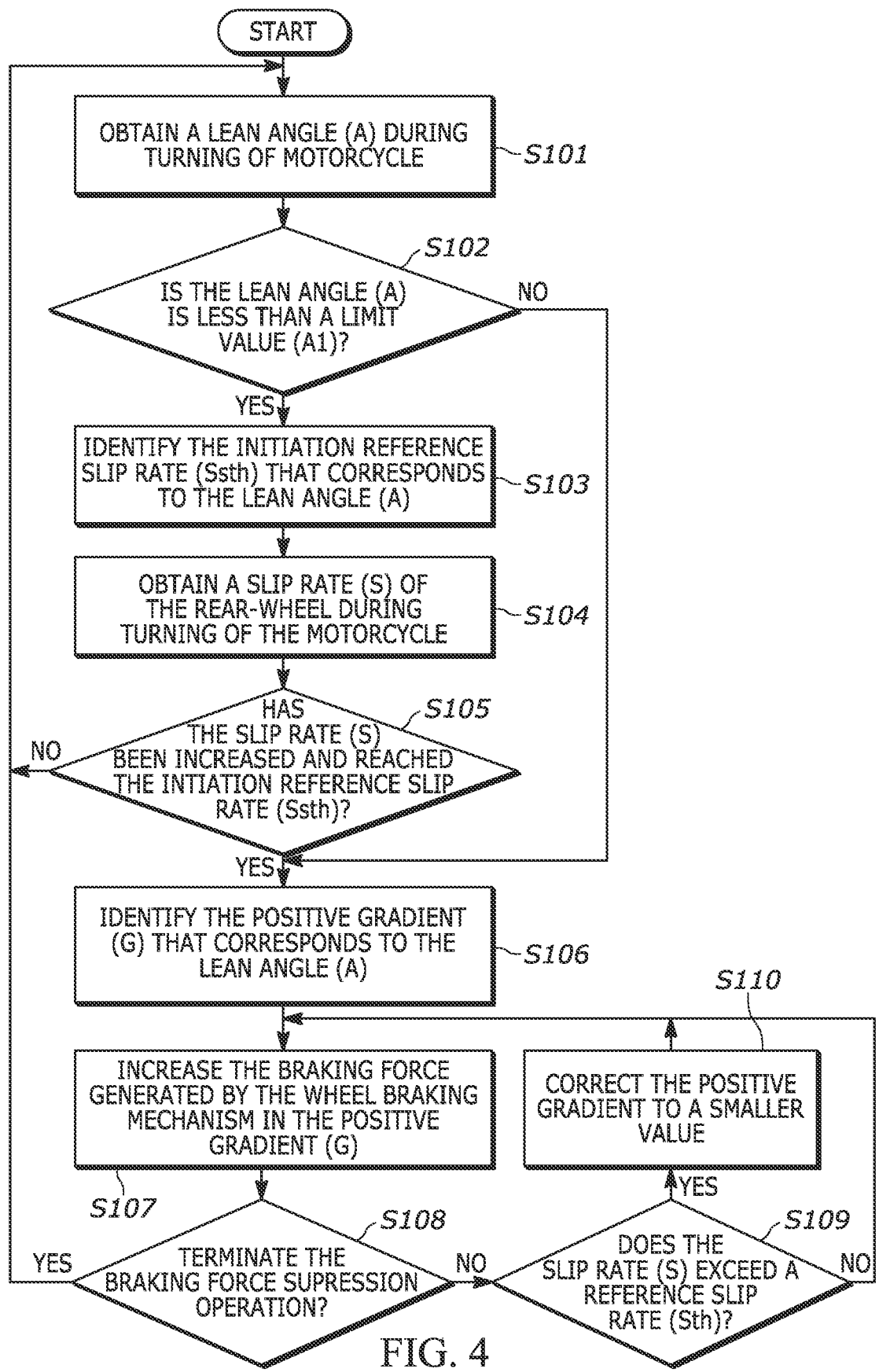
FIG. 4 is a view of one example of a flowchart of control that is executed by a controller of the motorcycle brake system according to the embodiment of the invention.

FIG. 4 is a view of one example of a flowchart of control that is executed by the controller of the motorcycle brake system according to the embodiment of the invention.

(Lean Angle Obtainment Step)

As depicted in FIG. 4, in step S101, the lean angle obtainment section 62 uses the detection signal of the lean angle sensor 41 to obtain the lean angle A during turning of the motorcycle 100. Then, the process proceeds to step S102. The lean angle obtainment section 62 may obtain the other physical quantity that can substantially be converted to the lean angle A. For example, the lean angle obtainment section 62 may obtain a remaining braking force on the rear wheel 4 in a vertical direction with respect to a road surface. The other physical quantity of the case also corresponds to the "lean angle" in the invention.

(Brake Operation Execution Step—1)

As depicted in FIG. 4, in step S102, the brake operation execution section 61 determines whether the lean angle A, which is obtained in step S101, is smaller than a limit value A1, which is set in advance. Preferably, the lean angle A, at which occurrence of slip of the rear wheel 4 is no longer permitted, is set as the limit value A1. If Yes, the process proceeds to step S103. If No, the process proceeds to step S106.

(Initiation Reference Setting Step)

As depicted in FIG. 4, in step S103, the initiation reference setting section 64 uses a corresponding relationship between the lean angle A and an initiation reference slip rate Ssth, which is stored in advance, to identify the initiation reference slip rate Ssth that corresponds to the lean angle A obtained in step S101. Once the initiation reference slip rate Ssth is set as an initiation reference of the braking force suppression operation, the process proceeds to step S104.

Figure 5:
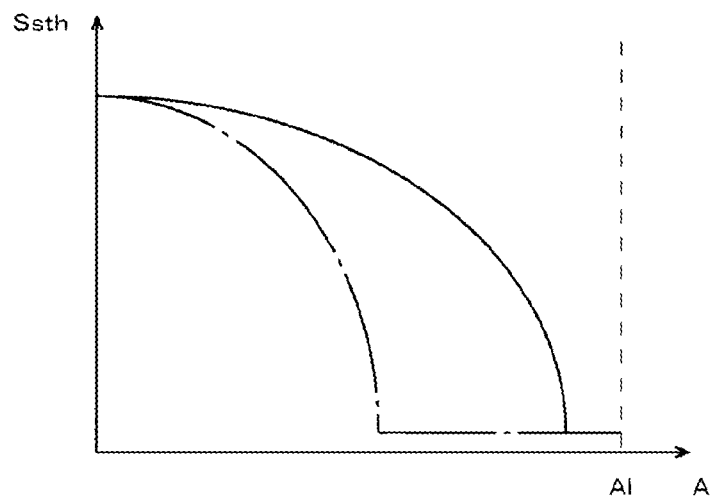
FIG. 5 is a graph of one example of a corresponding relationship between a lean angle and an initiation reference slip rate in the motorcycle brake system according to the embodiment of the invention.

FIG. 5 is a graph of one example of the corresponding relationship between the lean angle and the initiation reference slip rate in the motorcycle brake system according to the embodiment of the invention. Note that, in FIG. 5, a solid line represents the corresponding relationship in a case where a vehicle body speed Vref during turning of the motorcycle 100 is higher than a reference value, and a one-dot chain line represents the corresponding relationship in a case where the vehicle body speed Vref during turning of the motorcycle 100 is lower than the reference value.

As depicted in FIG. 5, the initiation reference slip rate Ssth is uniquely identified from the lean angle A, which is obtained in step S101. The initiation reference slip rate Ssth is set to a smaller value as the lean angle A is increased. Such a corresponding relationship that the initiation reference slip rate Ssth is reduced in a manner of a quadratic function along with an increase in the lean angle A is preferably established. In addition, in the case where the vehicle body speed Vref during turning of the motorcycle 100 is lower than the reference value, which is set in advance, the initiation reference setting section 64 preferably sets the initiation reference slip rate Ssth to a small value when compared to the case where the vehicle body speed Vref during turning of the motorcycle 100 is not lower than the reference value. The vehicle body speed Vref of the motorcycle 100 can be estimated by using the front-wheel rotational speed Vwf, which is detected by the front-wheel rotational speed sensor 42, and the rear-wheel rotational speed Vwr, which is detected by the rear-wheel rotational speed sensor 43, for example.

(Slip Rate Obtainment Step)

As depicted in FIG. 4, in step S104, the slip rate obtainment section 63 uses the detection signals of the front-wheel rotational speed sensor 42 and the rear-wheel rotational speed sensor 43 to obtain a slip rate S of the rear wheel 4 during turning of the motorcycle 100. Then, the process proceeds to step S105. The slip rate S of the rear wheel 4 can be derived by dividing a difference between the vehicle body speed Vref of the motorcycle 100 and the rear-wheel rotational speed Vwr, which is detected by the rear-wheel rotational speed sensor 43, by the vehicle body speed Vref. The slip rate obtainment section 63 may obtain another physical quantity that can substantially be converted to the slip rate S. The other physical quantity of the case also corresponds to the "slip rate" in the invention.

(Brake Operation Execution Step—2)

As depicted in FIG. 4, in step S105, the brake operation execution section 61 determines whether the slip rate S, which is obtained in step S104, has been increased and reached the initiation reference slip rate Ssth, which is set in step S103. If Yes, the process proceeds to step S106. If No, the process returns to step S101.

(Positive Gradient Setting Step)

As depicted in FIG. 4, in step S106, the positive gradient setting section 65 uses a corresponding relationship between the lean angle A and a positive gradient G, which is stored in advance, to identify the positive gradient G that corresponds to the lean angle A obtained in step S101. Then, once the positive gradient G is set as a positive gradient of the braking force that is generated by the wheel braking mechanism 14 upon initiation of the braking force suppression operation, the process proceeds to step S107.

Figure 6:
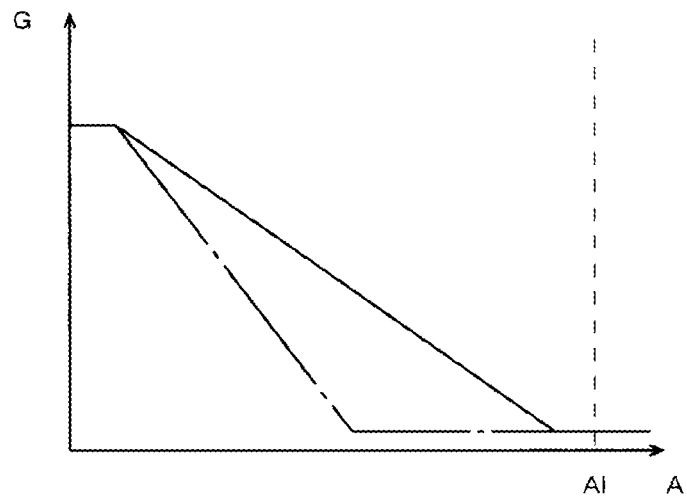
FIG. 6 is a graph of one example of a corresponding relationship between the lean angle and a positive gradient in the motorcycle brake system according to the embodiment of the invention.

FIG. 6 is a graph of one example of the corresponding relationship between the lean angle and the positive gradient in the motorcycle brake system according to the embodiment of the invention. Note that, in FIG. 6, a solid line represents the corresponding relationship in the case where the vehicle body speed Vref during turning of the motorcycle 100 is higher than the reference value, and a one-dot chain line represents the corresponding relationship in the case where the vehicle body speed Vref during turning of the motorcycle 100 is lower than the reference value.

As depicted in FIG. 6, the positive gradient G is uniquely identified from the lean angle A, which is obtained in step S101. The positive gradient G is set to a smaller value as the lean angle A is increased. At least in a region where the lean angle A is large (a region near the limit value A1), the positive gradient G becomes the gentler positive gradient than the positive gradient that is simulated in the normal state, that is, the gentler positive gradient than the positive gradient that is simulated in a case where the braking force on the rear wheel 4, which is generated by the wheel braking mechanism 14, depends only on the input to the brake operation section 13. Such a corresponding relationship that the positive gradient G is reduced in a manner of a linear function along with the increase in the lean angle A is preferably established. In addition, in the case where the vehicle body speed Vref during turning of the motorcycle 100 is lower than the reference value, which is set in advance, the positive gradient setting section 65 preferably sets the positive gradient G to a small value when compared to the case where the vehicle body speed Vref during turning of the motorcycle 100 is not lower than the reference value.

(Brake Operation Execution Step—3)

As depicted in FIG. 4, in step S107, the brake operation execution section 61 increases the braking force generated by the wheel braking mechanism 14 in the positive gradient G which is set in step S106. In this way, the braking force suppression operation is initiated. More specifically, the brake operation execution section 61 controls to open/close the inlet valve 31 of the wheel braking mechanism 14 through duty control, pulse control, a combination thereof, or the like, so as to make the wheel braking mechanism 14 generate the desired braking force.

(Brake Operation Execution Step—4)

As depicted in FIG. 4, in step S108, the brake operation execution section 61 determines whether to terminate the braking force suppression operation. If Yes, the process returns to step S101. If not, the process proceeds to step S109. For example, in the case where the determination as Yes is made in step S102 and the process reaches step S108, the brake operation execution section 61 terminates the braking force suppression operation when the slip rate S at a time point of being obtained by the slip rate obtainment section 63 is smaller than the initiation reference slip rate Ssth. Meanwhile, for example, in the case where the determination as No is made in step S102 and the process reaches step S108, the brake operation execution section 61 terminates the braking force suppression operation when the lean angle A at a time point of being obtained by the lean angle obtainment section 62 is smaller than the limit value A1.

(Brake Operation Execution Step—5)

As depicted in FIG. 4, in step S109, the brake operation execution section 61 determines whether the slip rate S at the time point of being obtained by the slip rate obtainment section 63 exceeds a reference slip rate Sth, which is set in advance. If Yes, the process proceeds to step S110. If No, the process returns to step S107. The reference slip rate Sth of the case where the determination as Yes is made in step S102 and the process reaches step S108 is set to be larger than the initiation reference slip rate Ssth.

(Brake Operation Execution Step—6)

As depicted in FIG. 4, in step S110, the brake operation execution section 61 corrects the positive gradient which is set by the positive gradient setting section 65, to a smaller value than the value thereof. Then, the process returns to step S107.

(Action of Braking Force Suppression Operation)

Figure 7:
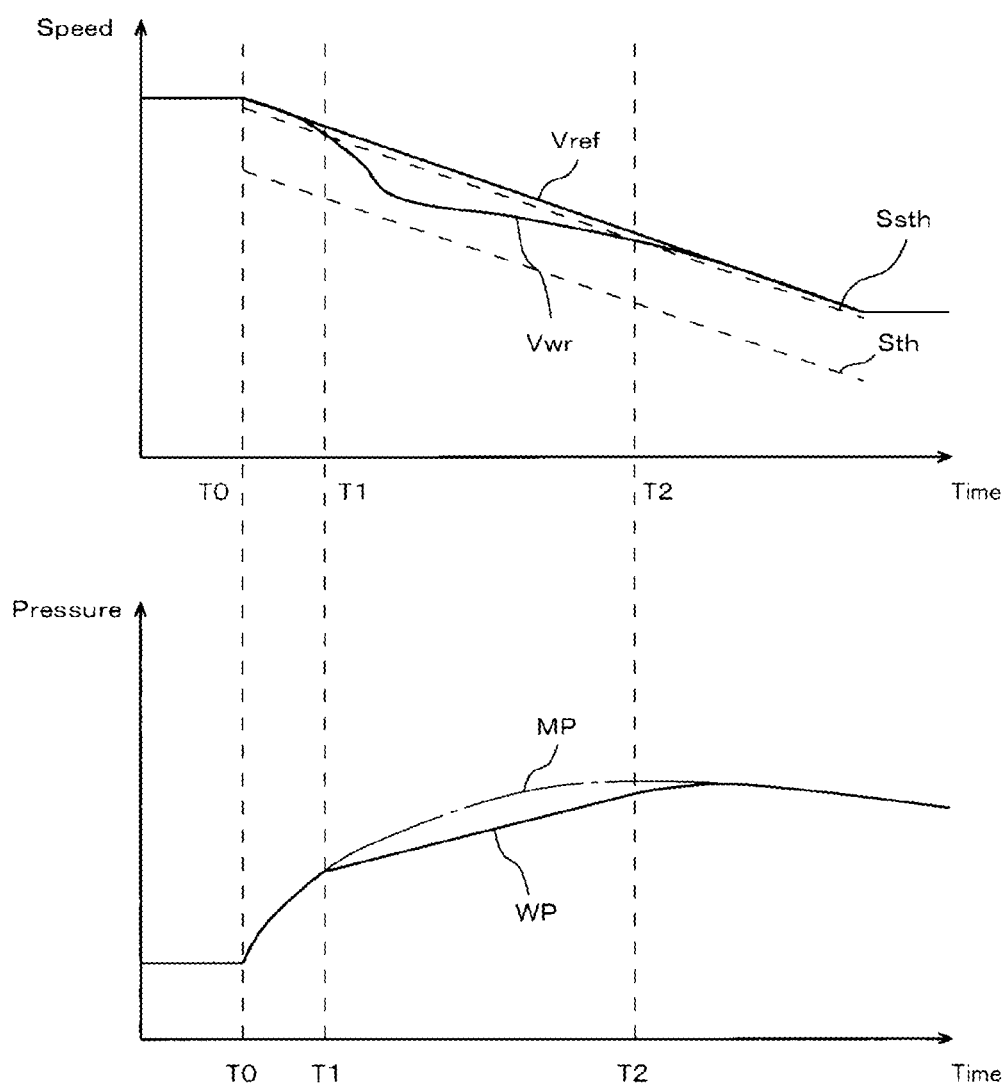
FIG. 7 includes graphs that illustrate an effect of the motorcycle brake system according to the embodiment of the invention in the case where a braking force suppression operation is executed.
Figure 8:
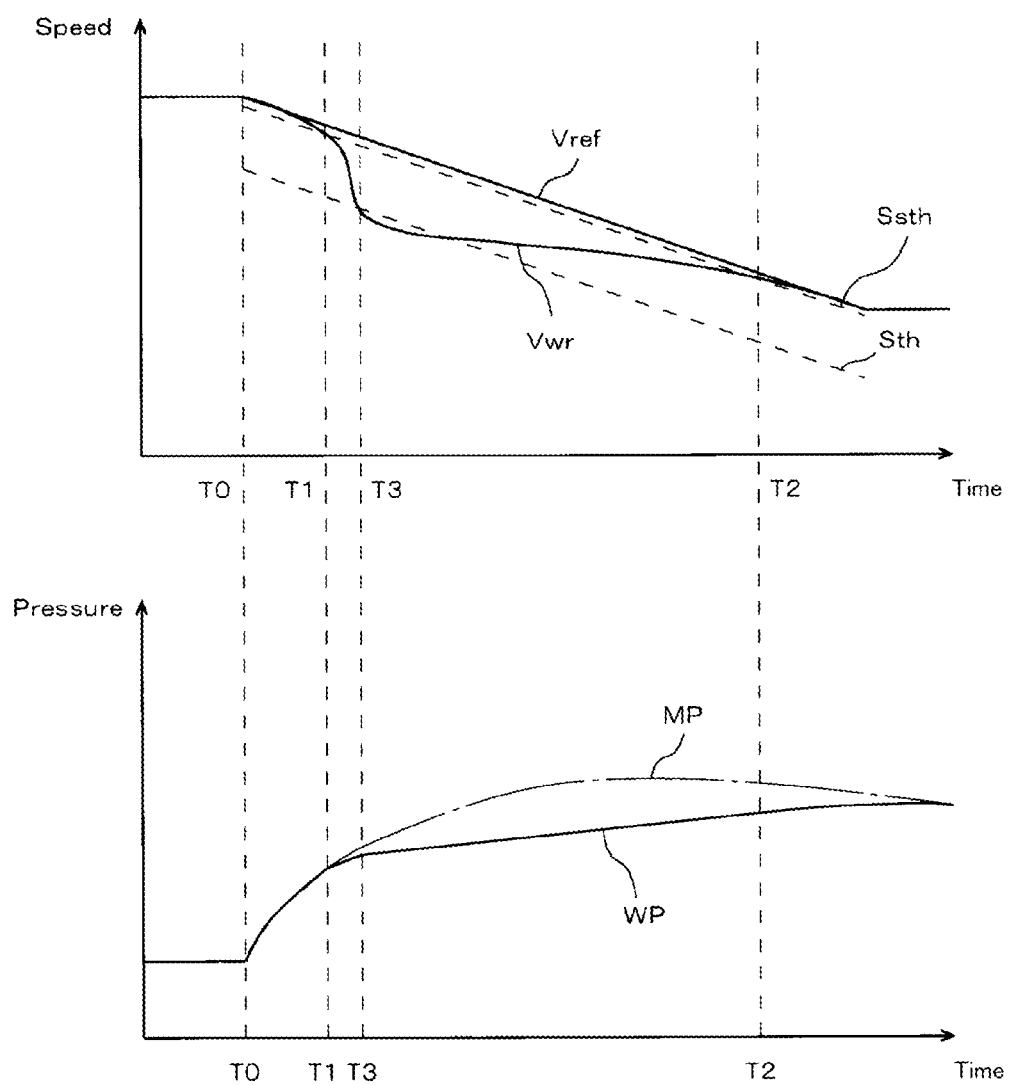
FIG. 8 includes graphs that illustrate an effect of the motorcycle brake system according to the embodiment of the invention in the case where the braking force suppression operation is executed.

FIG. 7 and FIG. 8 each include graphs that illustrate an effect of the motorcycle brake system according to the embodiment of the invention in the case where the braking force suppression operation is executed. Note that FIG. 7 depicts the following case; the braking force suppression operation is initiated after the determination as Yes is made in step S102, and the braking force suppression operation is terminated without making the determination as Yes in step S109. In addition, FIG. 8 depicts the following case; the braking force suppression operation is initiated after the determination as Yes is made in step S102, and the braking force suppression operation is terminated after the determination as Yes is made in step S109.

As depicted in FIG. 7, during turning of the motorcycle 100, when the input to the brake operation section 13, that is, a master cylinder hydraulic pressure MP starts being increased at time T0, the difference between the vehicle body speed Vref of the motorcycle 100 and the rear-wheel rotational speed Vwr is increased, and the slip rate S, which is obtained by the slip rate obtainment section 63, starts being increased. Thereafter, at time T1, when the slip rate S exceeds the initiation reference slip rate Ssth, which is set by the initiation reference setting section 64, the braking force suppression operation is initiated. Then, the braking force suppression operation continues for a period until time T2, at which a termination reference is satisfied, and the braking force generated by the wheel braking mechanism 14, that is, a wheel cylinder hydraulic pressure WP is increased in the positive gradient which is set by the positive gradient setting section 65.

In addition, as depicted in FIG. 8, after the braking force suppression operation is initiated, the slip rate S, which is obtained by the slip rate obtainment section 63, exceeds the reference slip rate Sth at time T3. In such a case, the positive gradient G is corrected to the small value. Then, the braking force suppression operation continues for the period until the time T2, at which the termination reference is satisfied, and the braking force generated by the wheel braking mechanism 14, that is, the wheel cylinder hydraulic pressure WP is increased in the corrected positive gradient G <Effects of Motorcycle Brake System>

A description will be made on effects of the motorcycle brake system according to the embodiment.

In the motorcycle brake system 10, the controller 60 includes: the positive gradient setting section 65 that sets the positive gradient G in the braking force suppression operation; and the lean angle obtainment section 62 that obtains the lean angle A during turning of the motorcycle 100, the brake operation execution section 61 initiates the braking force suppression operation in the positive gradient which is set by the positive gradient setting section 65, and the positive gradient setting section 65 sets the positive gradient G that corresponds to the lean angle A obtained by the lean angle obtainment section 62 as the positive gradient G in the braking force suppression operation. Thus, a sensor that can detect the input to the brake operation sections 11, 13 can be eliminated, and the requests of simplification, downsizing, cost cut, and the like of the motorcycle brake system 10 can be met.

Preferably, in the motorcycle brake system 10, the positive gradient setting section 65 sets the positive gradient G to the smaller value as the lean angle A, which is obtained by the lean angle obtainment section 62, is increased. With such control, even in the case where the braking force suppression operation is executed by the motorcycle brake system 10, from which the sensor capable of detecting the input to the brake operation sections 11, 13 is eliminated, the behavior of the motorcycle 100 can be stabilized by optimizing the braking force suppression operation.

In particular, in the case where the vehicle body speed Vref during turning of the motorcycle 100 is lower than the reference value, the positive gradient setting section 65 preferably sets the positive gradient G to the small value when compared to the case where the vehicle body speed Vref is higher than the reference value. With such control, even in the case where the braking force suppression operation is executed by the motorcycle brake system 10, from which the sensor capable of detecting the input to the brake operation sections 11, 13 is eliminated, the braking force suppression operation can achieve both of stabilization of the behavior of the motorcycle 100 in a turning state at a high speed, that is, a state of being less likely to fall, and stabilization of the behavior of the motorcycle 100 in a turning state at a low speed, that is, a state of being more likely to fall.

Preferably, in the motorcycle brake system 10, the controller 60 further includes: the initiation reference setting section 64 that sets the initiation reference of the braking force suppression operation; and the slip rate obtainment section 63 that obtains the slip rate S of each of the wheels (the front wheel 3 and the rear wheel 4) during turning of the motorcycle 100. The initiation reference setting section 64 sets the initiation reference slip rate Ssth, which corresponds to the lean angle A obtained by the lean angle obtainment section 62, as the initiation reference. When the slip rate S, which is obtained by the slip rate obtainment section 63, is increased and reaches the initiation reference slip rate Ssth, the brake operation execution section 61 initiates the braking force suppression operation. Accordingly, even when the braking force suppression operation changes timing to initiate the braking force suppression operation in accordance with the lean angle A, the sensor that can detect the input to the brake operation sections 11, 13 can be eliminated.

In particular, the initiation reference setting section 64 preferably sets the initiation reference slip rate Ssth to the smaller value as the lean angle A, which is obtained by the lean angle obtainment section 62, is increased. Accordingly, even in the case where the braking force suppression operation is executed by the motorcycle brake system 10, from which the sensor capable of detecting the input to the brake operation sections 11, 13 is eliminated, the braking force suppression operation is initiated at appropriate timing. In this way, the behavior of the motorcycle 100 can be stabilized.

Furthermore, in the case where the vehicle body speed Vref during turning of the motorcycle 100 is lower than the reference value, the initiation reference setting section 64 preferably sets the initiation reference slip rate Ssth to the small value when compared to the case where the vehicle body speed Vref is higher than the reference value. With such control, even in the case where the braking force suppression operation is executed by the motorcycle brake system 10, from which the sensor capable of detecting the input to the brake operation sections 11, 13 is eliminated, the braking force suppression operation can achieve both of the stabilization of the behavior of the motorcycle 100 in the turning state at the high speed, that is, the state of being less likely to fall, and the stabilization of the behavior of the motorcycle 100 in the turning state at the low speed, that is, the state of being more likely to fall.

Preferably, in the motorcycle brake system 10, the brake operation execution section 61 corrects the positive gradient G on the basis of the slip rate S, which is obtained by the slip rate obtainment section 63 during the braking force suppression operation, and continues the braking force suppression operation by using the corrected positive gradient G That is, even in the case where the braking force suppression operation is executed by the motorcycle brake system 10, from which the sensor capable of detecting the input to the brake operation sections 11, 13 is eliminated, execution of the irrelevant braking force suppression operation, which is caused by the elimination, is suppressed. Thus, applicability of the braking force suppression operation is improved.

In particular, the brake operation execution section 61 preferably corrects the positive gradient G to the small value in the case where the slip rate S, which is obtained by the slip rate obtainment section 63 during the braking force suppression operation, exceeds the reference slip rate Sth. With such control, the execution of the irrelevant braking force suppression operation is reliably suppressed, and the applicability of the braking force suppression operation can reliably be improved.

Preferably, in the motorcycle brake system 10, in the case where the lean angle A, which is obtained by the lean angle obtainment section 62, exceeds the limit value A1, the brake operation execution section 61 initiates the braking force suppression operation before the initiation reference of the braking force suppression operation is satisfied. Accordingly, even in the case where the braking force suppression operation is executed by the motorcycle brake system 10, from which the sensor capable of detecting the input to the brake operation sections 11, 13 is eliminated, the behavior of the motorcycle 100 in a turning state at the large lean angle A can be stabilized at high reliability.

The description has been made so far on the embodiment. However, the invention is not limited to the description of the embodiment. For example, the embodiment may only partially be executed. In addition, an order of the steps may be switched, for example.

More specifically, for example, in the embodiment, the initiation reference setting section 64 sets the initiation reference slip rate Ssth as the initiation reference. However, completely different information from the initiation reference slip rate Ssth (for example, whether an on signal of a brake lamp is generated in a state where the lean angle A is large, or the like) may be set as the initiation reference. In the case where the initiation reference slip rate Ssth is set as the initiation reference, in addition to the above-described effects, the following effect can be exerted: both of changing of the positive gradient G of the braking force, which is generated by each of the wheel braking mechanisms 12, 14, in accordance with the lean angle A and changing of timing to initiate the braking force suppression operation in accordance with the lean angle A can be realized by a simple configuration of obtaining the lean angle A and the slip rate S. Thus, setting of the initiation reference slip rate Ssth as the initiation reference is particularly preferred.

REFERENCE SIGNS LIST

1: Trunk
2: Handlebar
3: Front wheel
3a: Rotor
4: Rear wheel
4a: Rotor
10: Motorcycle brake system
11: Brake operation section
12: Wheel braking mechanism
13: Brake operation section
14: Wheel braking mechanism
21: Master cylinder
22: Reservoir
23: Brake caliper
24: Wheel cylinder
25: Primary channel
26: Secondary channel
31: Inlet valve
32: Outlet valve
33: Accumulator
34: Pump
41: Lean angle sensor
42: Front-wheel rotational speed sensor
43: Rear-wheel rotational speed sensor
50: Hydraulic pressure control unit
51: Base body
60: Controller
61: Brake operation execution section
62: Lean angle obtainment section
63: Slip rate obtainment section
64: Initiation reference setting section
65: Positive gradient setting section
100: Motorcycle
A: Lean angle
A1: Limit value
Vwf: Front-wheel rotational speed
Vwr: Rear-wheel rotational speed
Vref: Vehicle body speed
S: Slip rate
Ssth: Initiation reference slip rate
Sth: Reference slip rate
G: Positive gradient
MP: Master cylinder hydraulic pressure
WP: Wheel cylinder hydraulic pressure

The invention claimed is:

1. A motorcycle brake system for a motorcycle, the motorcycle brake system comprising:
   a brake operator; and
   a wheel braking assembly that brakes a wheel of the motorcycle; and
   a controller configured to:
      perform a lean angle obtainment step to obtain a lean angle during turning of the motorcycle,
      perform a positive gradient setting step to set a positive gradient, wherein the positive gradient corresponds to the lean angle obtained in the lean angle obtainment step,
      perform a brake operation execution step to initiate a braking force suppression operation in states where the motorcycle makes a turn and increases input to the brake operator, the braking force suppression operation being executed to increase braking force, which is generated by the wheel braking assembly, in a smaller positive gradient of hydraulic pressure of hydraulic fluid in a wheel cylinder than a positive gradient of hydraulic pressure of hydraulic fluid in a master cylinder in a case where the braking force on the wheel, which is generated by the wheel braking assembly, depends only on the input to the brake operator,
      wherein the braking force suppression operation is initiated in the positive gradient which is set by the positive gradient setting step when an initiation reference is satisfied.

2. The motorcycle brake system according to claim 1, wherein
   performing the positive gradient setting step sets the positive gradient to a smaller value as the lean angle, which is obtained by performing the lean angle obtainment step, is increased.

3. The motorcycle brake system according to claim 2, wherein
   in a case where a vehicle body speed during turning of the motorcycle is lower than a reference value, performing the positive gradient setting step sets the positive gradient to the smaller value when compared to a case where said vehicle body speed is higher than said reference value.

4. The motorcycle brake system according to claim 1, the controller further configured to:
perform an initiation reference setting step that sets the initiation reference; and
perform a slip rate obtainment step that obtains a slip rate of the wheel during turning of the motorcycle, wherein
performing the initiation reference setting step sets an initiation reference slip rate that corresponds to the lean angle obtained by performing the lean angle obtainment step as the initiation reference, and
performing the brake operation execution step initiates the braking force suppression operation when the slip rate, which is obtained by performing the slip rate obtainment step is increased and reaches the initiation reference slip rate.

5. The motorcycle brake system according to claim 4, wherein
performing the initiation reference setting step sets the initiation reference slip rate to a smaller value as the lean angle, which is obtained by performing the lean angle obtainment step, is increased.

6. The motorcycle brake system according to claim 5, wherein
in a case where a vehicle body speed during turning of the motorcycle is lower than a reference value, performing the initiation reference setting step sets the initiation reference slip rate to the smaller value when compared to a case where said vehicle body speed is higher than said reference value.

7. The motorcycle brake system according to claim 1, the controller further configured to:
perform a slip rate obtainment step that obtains a slip rate of the wheel during turning of the motorcycle, wherein
performing the brake operation execution step corrects the positive gradient based on the slip rate, which is obtained by performing the slip rate obtainment step during the braking force suppression operation, and continues the braking force suppression operation by using said corrected positive gradient.

8. The motorcycle brake system according to claim 7, wherein
performing the brake operation execution step corrects the positive gradient to the smaller value in a case where the slip rate, which is obtained by performing the slip rate obtainment step during the braking force suppression operation, exceeds a reference slip rate.

9. The motorcycle brake system according to claim 1, wherein
in a case where the lean angle, which is obtained by performing the lean angle obtainment step, exceeds a limit value, performing the brake operation execution step initiates the braking force suppression operation before the initiation reference is satisfied.

10. A control method of a motorcycle brake system, the motorcycle brake system including a brake operator that is provided in a motorcycle; and a wheel braking assembly that brakes a wheel of the motorcycle, the control method comprising:
a lean angle obtainment step to obtain a lean angle during turning of the motorcycle;
a positive gradient setting step to set a positive gradient, wherein the positive gradient corresponds to the lean angle obtained in the lean angle obtainment step; and
a brake operation execution step to initiate a braking force suppression operation in states where the motorcycle makes a turn and increases input to the brake operator, the braking force suppression operation being executed to increase braking force, which is generated by the wheel braking assembly, in a smaller positive gradient of hydraulic pressure of hydraulic fluid in a wheel cylinder than a positive gradient of hydraulic pressure of hydraulic fluid in a master cylinder in a case where the braking force on the wheel, which is generated by the wheel braking assembly, depends only on the input to the brake operator,
wherein the braking force suppression operation is initiated in the positive gradient which is set by the positive gradient setting step when an initiation reference is satisfied.

* * * * *